(12) United States Patent
Macklin et al.

(10) Patent No.: US 10,101,455 B1
(45) Date of Patent: Oct. 16, 2018

(54) APPARATUS UTILIZING ELECTRO-OPTICAL/INFRARED THREAT WARNING, PROACTIVE AND REACTIVE COUNTERMEASURES

(75) Inventors: Timothy E. Macklin, Newton Falls, OH (US); Susan E. Hall, Wadsworth, OH (US)

(73) Assignee: LOCKHEED MARTIN CORPORATION, Bethesda, MD (US)

(*) Notice: Subject to any disclaimer, the term of this patent is extended or adjusted under 35 U.S.C. 154(b) by 3393 days.

(21) Appl. No.: 11/439,767

(22) Filed: May 24, 2006

Related U.S. Application Data

(63) Continuation of application No. 11/075,642, filed on Mar. 8, 2005, now abandoned.

(51) Int. Cl.
| | |
|---|---|
| *G01S 7/495* | (2006.01) |
| *G01S 17/66* | (2006.01) |
| *G01S 17/02* | (2006.01) |
| *F41H 11/02* | (2006.01) |
| *G01S 7/38* | (2006.01) |
| *F41G 7/22* | (2006.01) |

(52) U.S. Cl.
CPC .............. *G01S 17/66* (2013.01); *F41H 11/02* (2013.01); *G01S 7/495* (2013.01); *G01S 17/026* (2013.01); *F41G 7/224* (2013.01); *G01S 7/38* (2013.01); *H04K 2203/24* (2013.01)

(58) Field of Classification Search
CPC .......... F41H 11/00; F41H 11/02; F41H 13/00; G01S 3/784; G01S 7/38; G01S 7/495; G01S 17/02; G01S 17/06; G01S 17/023; G01S 17/026; G01S 17/66; F41G 7/224; H04K 2203/00; H04K 2203/10; H04K 2203/24; H04K 2203/30
USPC ...... 250/348, 347, 336.1; 89/1.11; 356/4.01, 356/5.01, 5.1, 4.1
See application file for complete search history.

(56) References Cited

U.S. PATENT DOCUMENTS

| | | | |
|---|---|---|---|
| 5,628,196 A | 5/1997 | Farmer | 62/51.1 |
| 6,674,520 B1 | 1/2004 | Hicks et al. | 356/139.04 |
| 6,707,052 B1 * | 3/2004 | Wild et al. | 250/504 R |
| 7,193,691 B2 * | 3/2007 | Weber | 356/5.01 |
| 2006/0000987 A1 | 1/2006 | Weber | 250/504 R |
| 2006/0000988 A1 * | 1/2006 | Stuart et al. | 250/504 R |

* cited by examiner

*Primary Examiner* — James S Bergin

(57) ABSTRACT

An apparatus for combining electro-optical infrared threat warning, and proactive and reactive countermeasures includes a laser which generates a laser beam. A tracking module is included in the apparatus which scans a field of regard with the laser beam and collects threat signals generated from objects of interest. A passive warning module observes the threat signals in the field of regard and generates passive warning operational signals. A proactive module also observes the threat signals in the field of regard with the laser beam and generates proactive operational signals. A reactive module directs the laser beam at the objects of interest in said field of regard, and generates reactive operational signals. The modules exchange the operational signals therebetween and with the laser and the tracking module to at least monitor the objects of interest.

15 Claims, 3 Drawing Sheets

APPARATUS UTILIZING ELECTRO-OPTICAL/INFRARED THREAT WARNING, PROACTIVE AND REACTIVE COUNTERMEASURES

CROSS REFERENCE TO RELATED APPLICATION

This application is a continuation of application Ser. No. 11/075,642 filed Mar. 8, 2005, now abandoned which is hereby incorporated by reference.

TECHNICAL FIELD

The present invention herein resides in the art of defense systems for detecting potential threats and diverting incoming missiles. More particularly, the present invention relates to an apparatus that detects electro-optical and infrared devices for the purpose of observing, detecting and reacting to threats posed by such devices.

BACKGROUND ART

To protect and defend military platforms, such as ships, aircraft—commercial or military—and other related installations, it is known to provide countermeasure systems that detect incoming threats such as enemy aircraft or missiles, such as surface-to-air missiles. Known systems detect incoming threats, such as infrared missiles, and they deploy separate defensive countermeasures in an attempt to destroy or divert the threat. These systems are referred to as open-loop systems since no immediate determination as to the type of threat or effectiveness of the countermeasure is readily available. To overcome this deficiency, closed-loop systems have been developed which immediately determine the effectiveness of the countermeasure applied to divert or destroy the incoming threat.

One concern for national security is that military and commercial aircraft are susceptible to surface-to-air missiles and other man-portable weapons. Additionally, electro-optical/infrared tracking sensors used as adjuncts to missiles and anti-aircraft artillery, are also a threat to military aircraft. These devices use either active (laser beams or infrared light beams) or passive sensors for the purpose of targeting the aircraft or other platform. Typically, these devices employ mirrors or optic assemblies and once these devices lock-on to an aircraft, a distinct electronic signature is generated by the threat.

Known prior art systems utilize infrared countermeasures which receive a "hand over" from a dedicated missile warning system and then point and shoot at the in-flight missile and continue jamming until fly-by or the missile is effectively diverted. These known systems can only handle one threat at a time. As such, the prior art systems are deficient inasmuch as they require a dedicated stand-alone missile warning sensor. These systems are also ineffective inasmuch as they do not detect or counteract any pre-launch activity.

Based upon the foregoing, it is apparent there is a need for an apparatus which can detect and counter pre-launch as well as post-launch threats. In other words, there is a need for a device that is pre-emptive as well as defensive. There is also a need for a device that can address multiple threats at a single time and which can maintain a scanning routine and electronically jam incoming threats.

DISCLOSURE OF INVENTION

In light of the foregoing, it is a first aspect of the present invention to provide an apparatus for combining electro-optical infrared threat warning, and proactive and reactive countermeasures.

Other aspects of the invention, which shall become apparent as the detailed description proceeds are achieved by an apparatus for combining electro-optical infrared threat warning, and proactive and reactive countermeasures, the apparatus comprising: a laser which generates a laser beam; a tracking module which scans a field of regard with the laser beam, collects threat signals generated from objects of interest in the field of regard; a passive warning module for observing the threat signals in the field of regard, the passive warning module generating passive warning operational signals, a proactive module for observing the threat signals in the field of regard with the laser beam generating proactive operational signals; and a reactive module for directing the laser beam at the objects of interest in the field of regard, the reactive module generating reactive operational signals; wherein the modules exchange the operational signals therebetween and with the laser and the tracking module to at least monitor the objects of interest.

Another aspect of the invention is achieved by a countermeasure apparatus, comprising a laser which generates an in-band laser beam; and a tracking module which periodically scans a field of regard with the in-band laser beam to disrupt any potential threats.

Still another aspect of the invention is achieved by the countermeasure apparatus which includes a proactive module for observing any threat signals within a select area of the field of regard. The proactive module generates proactive operational signals and the tracking module and the laser receive the proactive operational signal directing the in-band laser beam within the select area at an object of interest generating the threat signals.

Yet another aspect of the invention is achieved by the countermeasure apparatus which includes a passive warning module for observing threat signals in the field of regard. The passive warning module generates passive warning operational signals and a reactive module receives the passive warning operational signals that are received by the tracking module and directs the laser beam at the threat signal. The laser includes a jam code in the laser beam to divert the threat.

BRIEF DESCRIPTION OF DRAWINGS

For a complete understanding of the aspects, techniques and structure of the invention, reference should be made to the following detailed description and accompanying drawings wherein.

BEST MODE FOR CARRYING OUT THE INVENTION

Figure 1:
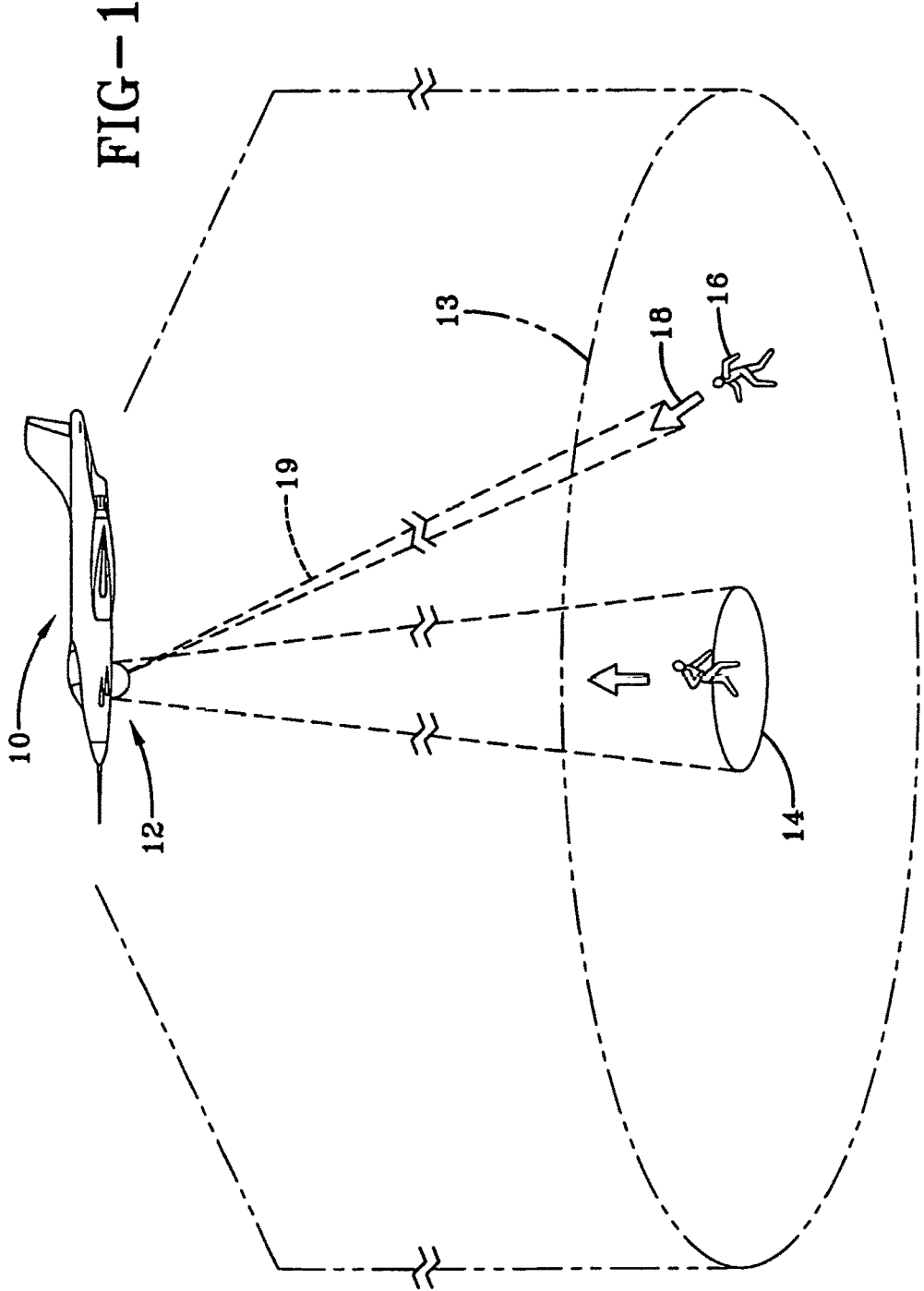
FIG. 1 is a schematic representation of a platform and an incoming missile threat.
Figure 2:
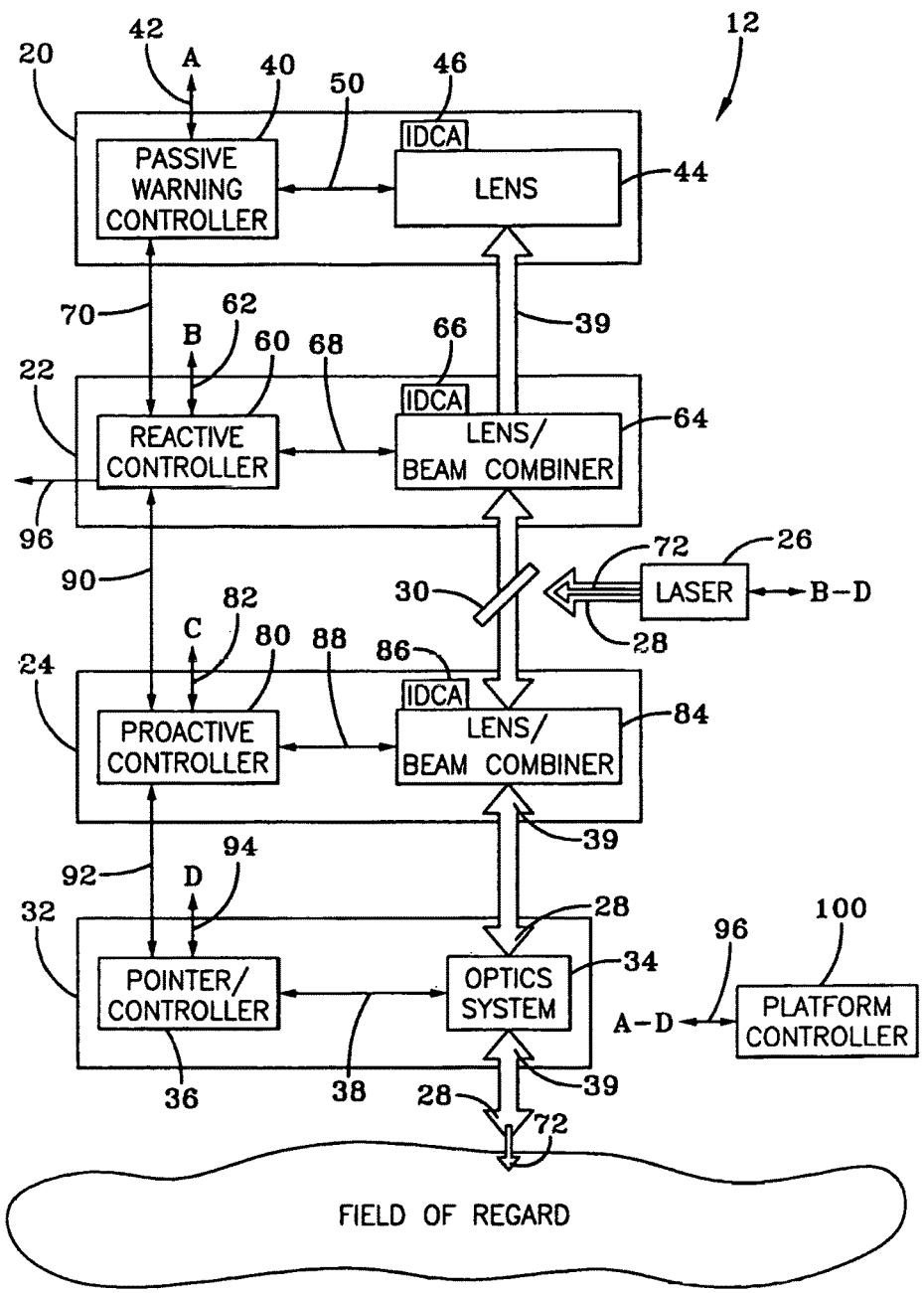
FIG. 2 is a schematic diagram of the apparatus according to the present invention.

Referring now to the drawings, and in particular to FIGS. 1 and 2, it can be seen that an aircraft, also referred to as a "platform," is designated generally by the numeral 10. The aircraft 10 or other platform can be a commercial or military aircraft, an aerostat, a ship, or any stationary or mobile installation that is prone to attack by electro-optical or infrared based projectiles. An apparatus for threat warning, and proactive and reactive countermeasures is designated generally by the numeral 12 and may be mounted on the platform or aircraft 10. It will also be appreciated that the apparatus 12 may be configured as a stand-alone device that provides protection for a number of nearby platforms. Generally, the apparatus 12 can detect threats—electro-optical or infrared—pre- or post-launch. The apparatus is capable of identifying the threat and generating a jam code or other signal to disrupt the "locking-on" or trajectory of the missile. The apparatus can also locate the source of the threat and provide information to other systems maintained on the platform for a possible counter-attack.

The apparatus 12 is capable of monitoring a passive/reactive scan zone designated generally by the numeral 13. The zone 13, which may also be referred to as a field of regard, covers an effective range of up to 10 kilometers or more. Contained within the passive/reactive scan zone 13 is a proactive scan zone designated generally by the numeral 14. The zone 14 is limited to areas of up to 5 kilometers or less and anything in this area identified by the apparatus 12 is considered to be an extreme threat inasmuch as this is the best range for surface-to-air missiles and the like. The proactive scan zone 14 is always a reduced or smaller area than the passive/reactive scan zone 13. In most instances, the proactive scan zone 14 is centered around the platform 10 and centered within the passive/reactive zone 13. Of course, the proactive zone may be oriented in a direction where the platform is most likely to be exposed to a threat within the passive/reactive zone 13. Contained within either of these zones 13 and 14 may be objects of interest which are designated generally by the numeral 16. These objects of interest may be surface-to-air missile launching devices, anti-aircraft artillery and any device which generates an electro-optic or infrared signature. Accordingly, these objects of interest may generate threat signals 18 which attempt to lock-on to the aircraft or platform. In the event one of these objects of interest successfully launch a missile or other threat, the apparatus defines a post-launch reactive zone 19 which may be anywhere within the scan zone 13. As will be described in detail, a normal scan sequence of the apparatus 12 is stopped and the apparatus employs direct countermeasures to divert the launched threat.

As best seen in FIG. 2, the apparatus 12 incorporates multiple modules to enable the apparatus and allow for the efficient exchange of data and optical signals to effectively counteract any potential and/or actual threat. The apparatus 12 includes a passive module 20 which detects objects of interest in the zone 13 during a scan thereof; a reactive module 22 which specifically points at a designated threat and directs countermeasures at the threat that has been launched; and a proactive module 24 which allows for directing a countermeasure at a pre-launch threat while scanning. The modules 20, 22 and 24 may collectively or separately communicate with each other as needed and one of the modules may function as a system-wide control mechanism. And it will further be appreciated that any one of the modules may function by itself or in select combination with another module.

An in-band laser 26 is associated with the apparatus and generates a laser beam 28 which may be directed or guided by a directional mirror 30. The mirror 30 may be provided with an aperture or otherwise configured to allow observed or threat-reflected signals to pass through to other modules in the apparatus. In any event, the laser beam is specifically directed and guided by a tracking module 32 which includes an optics system 34 which contains elements such as mirrors that may or may not be motorized so as to position or direct the laser beam 28 as determined by the modules. The tracking module 32 also includes a pointer/controller 36 which communicates with the modules 20-24 and generates an optics control signal 38 that provides operational signals to the optics system 34. Collectively, the tracking module 32 and the laser 26 allow for direction and guidance of the laser beam anywhere within the field of regard and, if needed, specifically at a designated threat. When the laser beam 28 is directed at a threat, any type of return signal is identified as a laser return signal 39 which may include a classification designation also referred to as a classified return signal. The passive module 20 includes a passive warning controller 40 which provides the necessary hardware, software and memory for implementing the functions associated therewith and for communicating with other components contained within the apparatus. The passive warning controller 40 generates a passive warning operational signal 42, also designated by the capital letter A. The operational signal 42 may be received by the modules 22,24 or 32 which may then act upon the data included in the signal as will be described. The controller 40 also communicates or is coupled with a lens 44 which may be in the form of a focal plane array, a charged coupled device or any other observation mechanism which allows for observation of the field of regard. An integrated dual cooler assembly (IDCA) 46 may be incorporated and associated with the lens 44. The assembly 46 is utilized to maintain an optimal operating temperature of the lens associated therewith. If the lens or associated components overheat, then the effective operating range of the apparatus can be significantly reduced. Observations detected by the lens 44 are transmitted to the passive warning controller 40 via a passive warning data signal 50 which may include video signals of the observed field of regard. The lens 44 observes the field of regard as the tracking module 32 scans the same. In other words, as the lens 44 observes the field of regard it can detect objects of interest such as unique signatures which may be in the form of heat, light, electro-optical signals or infrared signals that are directed at the platform, or any other signal or phenomenon that is unusual or observed. This can be done without energization of the laser inasmuch as the lens 44 is observing the field of regard. Any detection of a potential threat by the lens 44 is transmitted to the passive warning controller so as to catalog and track the location of a potential threat for further observation by any of the other modules. This information regarding the potential threats is contained within the passive warning operational signal 42.

The reactive module 22 includes a reactive controller 60 which provides the necessary hardware, software and memory for communicating with the other modules and implementing the aspects of the present invention. The reactive controller 60 generates a reactive controller operational signal 62 which is also designated by the capital letter B. The operational signal 62 is received by the laser 26 and may also be routed to the other modules. A lens/beam combiner 64 is included in the reactive module 22 and may be in the form of a focal plane array, a charge-coupled device or other similar observation type device which observes return signals 39. An integrated dual cooler assembly (IDCA) 66 is associated with the lens/beam combiner 64 and operates to maintain the combiner 64 at an optimum operating temperature. The signals detected by the combiner 64 are transmitted to the controller 60 via a reactive controller lens data signal 68, which may include video data. A bus signal line 70 interconnects the passive warning controller 40 and the reactive controller 60 so as to allow for exchange of data therebetween and between the other modules and the tracking system. On detection of a threat by the passive warning controller 40, the reactive module may generate a jam code 72 which is included in the laser beam 28 at an appropriate time. The tracking module and, in particular, the optics system 34 maintains focus of the jam code 72 on the threat until it is no longer deemed a threat. In other words, the reactive module 24, upon detection of a threat, such as a missile after launching, automatically slews the tracking module 32 at the threat and causes the laser to generate the jam code which diverts the threat.

The proactive module 24 includes a proactive controller 80 which includes the necessary hardware and software and memory for enabling the apparatus 12 and for communicating with the other modules and the tracking module 32 and the laser 26 as needed. The proactive controller 80 generates a proactive controller operational signal 82 which is designated by the capital letter C. The operational signal 82 is received by the laser 26 and the tracking module 32 in much the same manner as the operational signal 62 communicates with the same devices. The module 24 includes a lens/beam combiner 84 which provides a focal planar array, a charged-coupled device or any other related observation device for observing return signals 39. An integrated dual cooler assembly 86 is associated with the lens/beam combiner 84 so as to maintain an optimum operating temperature thereof. A proactive controller lens data signal 88, which may include video data, is exchanged between the combiner 84 and the proactive controller 80 so as to monitor data collected by the combiner 84 for transmission to the other modules and the laser 26. A bus signal line 90 may link the proactive and reactive controllers for the purpose of exchanging information as needed therebetween. The proactive controller 80 identifies the threats that are within the proactive zone 14 at a predetermined range up to 5 kilometers of the platform. As will be discussed in further detail, the tracking module 32 allows for scanning at a predetermined rate to detect any threat. The proactive controller then monitors the classified return signal as it scans by the threat a second time and generates an appropriate jam code. The jam code 72 is then included in the laser beam 28 and as the tracking system slows near approach of the threat again, the jam code 72 is included so as to interfere with the operation of the threat prior to launch.

The operational signals A-D in conjunction with the data signals 50, 68 and 88 are transmitted to the tracking module 32 and the laser 26 so as to observe and divert any potential threats to the platform. The lenses and mirrors within the optics system 34 are positionally adjusted as needed, and allow for the laser beam to be directed in such a manner that solely the proactive or reactive function is performed. In other words, the laser beam may be directed by the optics system 34 and the proactive controller to scan the proactive zone 14, or by the optics system 34 and the reactive controller at a threat in the reactive zone 13.

The apparatus 12 may also include a platform controller 100 which receives all of the operational signals via a bus signal 96 and allows for coordination of activities between the apparatus and the device upon which it is carried. As such, the data is converted or formatted in such a way that the platform controller can take evasive action simultaneous with the action taken by the apparatus in averting the threat. The platform controller 100 also includes the necessary hardware, software and memory for implementing such a conversion of data and for properly communicating with other systems maintained by the platform.

Figure 3:
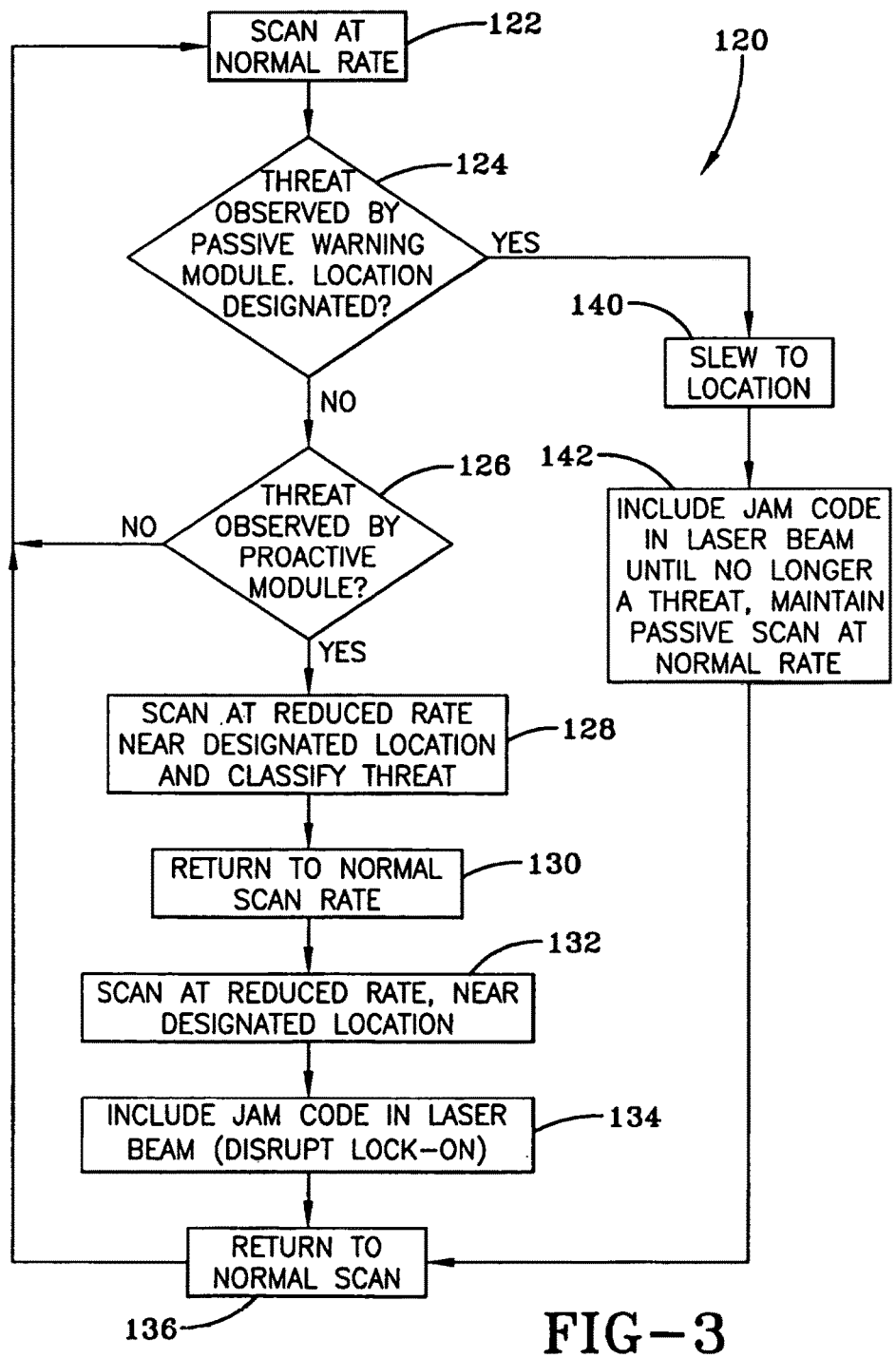
FIG. 3 is a flow chart setting out operation of the apparatus according to the present invention.

Referring now to FIG. 3, it can be seen that the operational steps for observing and responding to threats detected by the apparatus are designated generally by the numeral 120. Initially, the apparatus scans at a predetermined rate of 1-2 hertz in the field of regard at step 122. The passive warning controller looks for any threat at step 124 and if found, designates their location and distributes this information to the other modules. If a threat is not observed, the process continues to step 126 to determine whether a threat is observed, or not, by the proactive module in zone 14. If it is determined that the threat is within a predetermined range of concern, in other words within the proactive scan area then, at the next approach of the location of the threat, at step 128, the tracking system reduces the rate of scan at the designated location and classifies the threat. Next, at step 130, the tracking mechanism returns to a normal scan rate and at step 132 reduces the scanning at a reduced rate as it again nears the designated location. As the location is neared, at step 134, the laser beam includes a jam code so as to disrupt the lock-on of the identified threat and hopefully dissuade the threat from becoming active. Upon conclusion of step 134 the system returns to the normal scan rate at step 136.

Returning to step 126, if no optical or electronic signature or other threat is detected by the proactive module, then the process returns to step 122 and the normal scan procedure.

Returning to step 124, if it is determined that a threat was detected by the passive warning module, that is a "post-launch" detection has occurred, then the process proceeds to step 140 where the tracking module slews the optics systems 34 to focus directly on the location of the threat. At step 142, the laser beam includes a jam code until the threat is no longer deemed to be a threat. It will also be appreciated that at step 142 the passive module continues with the passive warning function such that any additional threat is recognized and dealt with in subsequent scans.

It will be appreciated by those skilled in the art that the apparatus 12 utilizes modules that may be selectively configured so as to minimize cost of the apparatus while still providing various levels of effectiveness. In particular, it will be appreciated that the tracking module 32 in combination with just the laser 26 can be used to periodically scan the field of regard. Such a configuration directs a laser beam within the field of regard and provides somewhat limited protection inasmuch as the in-band laser beam would interfere with the locking-on of a electro-optic threat. In other words, the laser beam would periodically, at about once a second, interfere with any locking-on of a missile threat and provide a somewhat effective deterrent. Such an embodiment would eliminate the need for modules 20, 22 and 24 thus significantly reducing the cost the apparatus.

Another variation of the system employs just the proactive module 24, the tracking module 32 and the laser 26. Accordingly, only steps 122-136 shown in FIG. 3 are implemented; however, such a methodology more effectively deters any threats within the proactive zone 14. In other words, any pre-launch locking-on by a threat within the proactive zone is effectively countered. Accordingly, use of the reactive module and the passive warning module would not be required.

Another alternative configuration of the apparatus 12 incorporates the passive warning module 20, the reactive module 22, the tracking module 32 and the laser 26. In such a configuration, the scanning procedure is implemented and upon any detection of a missile launch the apparatus 12 executes steps 140 and 142 shown in FIG. 3. This would provide enhanced coverage in that the ability to immediately counter any real threat can be addressed.

Based upon the foregoing, the advantages of the present invention are readily apparent. It will be appreciated that the apparatus described hereinabove allows for use of different infrared sensors such as midwave, near wave or longwave signals as to allow for upgrading of the laser and sensor technologies as those specific technologies mature and develop. The sensors included in the laser beam combiners may be in the form of a linear array which is synchronized to the laser with optimal ranging capabilities. It will also be appreciated that a staring array, which is also synchronized to the laser, may provide the desired ranging capability. The apparatus is also advantageous inasmuch as it may be installed directly with the platform or it may be used as a stand-alone unit that is adapted to the platform. The apparatus is modifiable inasmuch as it can be configured as a proactive scan only or a reactive scan wherein the laser beam is pointed directly at a post-launch threat.

The apparatus can also be configured for a countermeasures capability by utilizing only a scanning mid-wave infrared laser. This eliminates the need for use of cameras. However, no point and shoot capabilities would be enabled in this variation.

The apparatus can detect and counter pre-launch as well as post-launch threats. In other words, the apparatus is pre-emptive as well as defensive. Multiple threats can be addressed somewhat simultaneously since the apparatus can detect, identify and jam while scanning across the field of regard in a non-continuous countermeasure approach. As such, the apparatus can interrogate the threat while jamming and can also implement jamming sequences while scanning the entire field of regard.

Based upon the foregoing disclosure, it should now be apparent that the invention described herein will carry out the objects set forth hereinabove. It is, therefore, to be understood that any variations evident fall within the scope of the claimed invention and thus, the selection of specific component elements can be determined without departing from the spirit of the invention herein disclosed and described. Thus, the scope of the invention shall include all modifications and variations that may fall within the scope of the attached claims.

What is claimed is:

1. An apparatus for combining electro-optical infrared threat warning, and proactive and reactive countermeasures, the apparatus comprising:
    a laser which generates a laser beam;
    a tracking module which scans a field of regard with said laser beam at a normal scan rate and collects threat signals generated from objects of interest in said field of regard;
    a passive warning module for observing said threat signals in a proactive scan zone contained within said field of regard, said passive warning module generating passive warning operational signals;
    a proactive module for observing said threat signals in said field of regard with said laser beam and generating proactive operational signals; and
    a reactive module for directing said laser beam at the objects of interest in a post-launch reactive zone contained within said field of regard, said reactive module generating reactive operational signals;
    wherein said modules exchange said operational signals therebetween and with said laser and said tracking module to at least monitor the objects of interest and whereupon detection of a pre-launch threat in said proactive scan zone by said proactive module causes said tracking module to momentarily reduce said scan rate near a designated location and disrupt lock-on of said pre-launch threat and said tracking module subsequently returns to said normal scan rate in said field of regard, and wherein detection of a post-launch threat by said passive warning module causes said tracking module to slew to a designated location of said post-launch threat and said reactive module includes a jam code in said laser beam to divert said post-launch threat until no longer a threat.

2. The apparatus according to claim 1, wherein said tracking module comprises:
    a pointer controller which receives said operational signals from at least one of said modules and generates an optics control signal;
    an optics system which receives said optics control signal and directs said laser beam as needed in said field of regard.

3. The apparatus according to claim 2, wherein said passive warning module comprises:
    a passive lens which observes said objects of interest, said passive lens generating a passive lens data signal; and
    a passive warning controller which receives said passive lens data signal to determine whether said threat signals require further attention and generates said passive warning operational signals.

4. The apparatus according to claim 3 wherein said passive warning operational signal is received by said pointer controller so that said field of regard is scanned at a normal rate.

5. The apparatus according to claim 4, further comprising:
    a passive cooler assembly coupled to said passive lens.

6. The apparatus according to claim 4, wherein said proactive module comprises:
    a proactive lens/beam combiner which observes a reflected laser return signal from said objects of interest, said proactive lens/beam combiner generating a proactive data signal; and
    a proactive controller which receives said proactive data signal to classify said threat signals and determine a range of threat and generate said proactive operational signals.

7. The apparatus according to claim 6, further comprising:
    a proactive cooler assembly coupled to said proactive lens/beam combiner.

8. The apparatus according to claim 6, wherein said reactive module comprises:
    a reactive lens/beam combiner which observes said reflected laser return signal from said objects of interest, said reactive lens/beam combiner generating a reactive data signal; and
    a reactive controller which receives said reactive data signal and generates said reactive operational signals which includes instructions to said laser to incorporate a jam code into said laser beam.

9. The apparatus according to claim 8 further comprising:
    a reactive cooler assembly coupled to said reactive lens/beam combiner.

10. The apparatus according to claim 8, further comprising:
    a platform controller linked to at least one of said other controllers to receive said operational signals to coordinate operation between the apparatus and a platform that carries the apparatus, said platform controller configured to take evasive action based upon said operational signals.

11. The apparatus according to claim 8, wherein said passive warning controller generates a passive threat signal when a launched threat is detected in said field of regard, said passive threat signal including range and location information.

12. The apparatus according to claim 11, wherein said reactive controller receives said passive threat signal and generates a signal received by said pointer controller so as to slew at the launched threat.

13. The apparatus according to claim 12, wherein said reactive controller detects a classify return signal in said reflected laser return signal and generates said jam code for inclusion in said laser beam.

14. The apparatus according to claim 6, wherein said proactive controller generates a jam code and slows scanning by said laser beam around the location of said pre-launch threat while said jam code is included in said laser beam.

15. The apparatus according to claim 14, wherein said reactive controller receives said passive threat signal and determines whether an active threat is present in said field of regard, said reactive controller instructing said pointer controller to slew at said active threat location while said jam code is included in said laser beam.

\* \* \* \* \*